US012615487B1

(12) United States Patent
Connolly et al.

(10) Patent No.: US 12,615,487 B1
(45) Date of Patent: Apr. 28, 2026

(54) CONGRUENCY FOR AUDIO CONTENT CREATION

(71) Applicant: Apple Inc., Cupertino, CA (US)

(72) Inventors: Matthew S. Connolly, San Jose, CA (US); Jue Wang, Sunnyvale, CA (US); James Bean, Portland, CA (US); Christopher J. Moulios, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 18/327,761

(22) Filed: Jun. 1, 2023

Related U.S. Application Data

(60) Provisional application No. 63/348,739, filed on Jun. 3, 2022.

(51) Int. Cl.

| | |
|---|---|
| ***H04S 7/00*** | (2006.01) |
| ***H04R 5/027*** | (2006.01) |
| ***H04R 5/033*** | (2006.01) |
| ***H04S 1/00*** | (2006.01) |

(52) U.S. Cl.
CPC ............. *H04S 7/304* (2013.01); *H04R 5/027* (2013.01); *H04R 5/033* (2013.01); *H04S 1/007* (2013.01); *H04S 7/40* (2013.01); *H04S 2400/11* (2013.01); *H04S 2400/13* (2013.01); *H04S 2400/15* (2013.01)

(58) Field of Classification Search
CPC . H04S 7/304; H04S 1/007; H04S 7/40; H04S 2400/11; H04S 2400/13; H04S 7/301; H04S 2400/15; H04R 5/027; H04R 5/033
See application file for complete search history.

(56) References Cited

U.S. PATENT DOCUMENTS

| | | | | |
|---|---|---|---|---|
| 11,765,537 | B2 * | 9/2023 | Wang | H04R 3/005 381/303 |
| 12,363,492 | B1 * | 7/2025 | Delikaris Manias | H04R 3/005 |
| 2014/0119581 | A1 | 5/2014 | Tsingos et al. | |
| 2016/0269712 | A1 | 9/2016 | Ostrover et al. | |
| 2018/0109899 | A1 | 4/2018 | Arana | |
| 2023/0176811 | A1 | 6/2023 | Thall et al. | |
| 2024/0205636 | A1 * | 6/2024 | Cosi | H03G 5/005 |
| 2024/0281202 | A1 * | 8/2024 | Williams | G06F 3/162 |

* cited by examiner

*Primary Examiner* — Angelica M Mckinney
(74) *Attorney, Agent, or Firm* — Aikin & Gallant, LLP

(57) ABSTRACT

An audio processing system may be configured to play a sound source through speakers of the audio processing system. The system may determine a loudness of the sound source as heard by a user of the electronic device. The system may determine a playback loudness for the sound source that matches the loudness of the sound source as heard by the user. The system may author an audio work which includes the sound source. In a playback environment, the sound source is output by speakers of a headworn device at the playback loudness.

20 Claims, 6 Drawing Sheets

CONGRUENCY FOR AUDIO CONTENT CREATION

This nonprovisional patent application claims the benefit of the earlier filing date of U.S. provisional application No. 63/348,739 filed Jun. 3, 2022.

FIELD

One aspect of the disclosure relates to preserving audio information in an authoring environment of an audio work which may be used for playback of the audio work.

BACKGROUND

Content, such as an audio work, which may include an audiovisual work, may be created digitally on an electronic device. An audio work may be created using various authoring tools, which may run as one or more applications on the electronic device. Content creation tools may give users the ability to control and memorialize various aspects of the audio work, such as how visual and audio components are to be presented to a user during playback. An audio work may include a song, a movie, a computer application, a videogame, an immersive extended reality experience, or other audio work.

SUMMARY

A user may use an electronic device to author an audio work, such as a song, a movie, a computer application, a videogame, an immersive extended reality experience, or other audio work. Content creation tools (e.g., computer applications) which run on the electronic device may allow users to select sounds for sound sources and set audio characteristics such as loudness, position, or other audio characteristics for each of the sound sources. Some content may have individual sound sources (e.g., object-based audio), and those sound sources may be associated with a virtual position. Other content may have one or more audio channels that are associated with a speaker layout (e.g., mono, stereo, 5.1, 7.1, etc.). Regardless, of the format, the audio work may be spatially rendered during playback, such that a listener perceives the sound sources or channels of the audio work to be emanating from a location (e.g., in front of, behind, above, or to the side) relative to the listener. The location of the sound source may correspond to a visual presentation of the sound source that is presented to the user during playback. A content creation tool may audition various sounds for a user during creation of the content, allow the user to set loudness of the sound source, and/or allow the user to place and test the sound source in various positions. The content creation tool may simulate the loudness of the sound based on the position of the sound source.

For example, a user may add a bird, a baby, a car, a robot, or another sound source to an audio work. The user may attach a sound to the sound source and specify a location of the sound source or set a loudness to the sound source. The user may select and audition various sounds for a given sound source and test the sound in a scene of the work. The user may select the sound from among a digital library and control a loudness level of the sound, which is played back to the user at the user's workstation. Once that loudness is to the user's liking, the user may save the car horn with that loudness in the saved audio work.

Without additional features, however, the loudness of the sound as heard by a user who is the author of the work at the workstation may be different from the loudness of the sound when the work is played back in the playback environment. For example, at the workstation, the loudness of a sound source may be attenuated as the sound travels from speakers of the workstation to the cars of the user. This attenuation may be characterized by the inverse square law or another attenuation model. When the content is played over headphones at the same level, however, the car horn may sound louder because it travels directly to the cars of the user, with little or no attenuation.

Further, if the car horn is spatially rendered during playback to correspond to a visual representation of the sound source (e.g., a vehicle) then the loudness of the sound as heard at the workstation may not be representative of the desired loudness as intended by the author, due to the attenuation of sound or due to the user's distance from a display of the workstation. The user's distance from a display of the workstation may also influence how the user wishes to perceive the loudness of the device, as described in the present disclosure. As such, variations in the loudness at which a user hears an auditioned sound, and/or a position of the user relative to the workstation during the time of authoring, may affect how the user intends for a given sound source to be experienced. Such information (e.g., the loudness at which the user hears the auditioned sound and/or the position of the user relative to the workstation) may be preserved in the audio work so that the user's intention for the loudness of the sound source is preserved in the playback environment.

In some aspects, a method, includes playing a sound source through speakers of an electronic device, determining a loudness of the sound source as heard by a user of the electronic device, determining a playback loudness for the sound source that matches the loudness of the sound source as heard by the user, and authoring an audio work which includes the sound source wherein, upon playback of the audio work, the sound source is output by speakers of a headworn device at the playback loudness. As such, the loudness of the playback content as experienced by a listener matches that which the user initially intended when the work was authored on the electronic device (e.g., a workstation).

In some aspects, a method, includes playing a sound source through speakers of an electronic device, determining a loudness of the sound source as heard by a user of the electronic device, determining a playback loudness for the sound source that matches the loudness of the sound source as heard by the user and associating the playback loudness for the sound source with a position of the user relative to the electronic device, and authoring an audio work which includes the sound source wherein, upon playback of the audio work, the sound source is output by speakers of a headworn device at the playback loudness which is scaled based on the position of the user relative to the electronic device. For example, the audio work may include a loudness scaling that includes the playback loudness and the position of the user relative to the electronic device (e.g., a ratio or relationship) as determined at the authoring station. In such a manner, the work may be played back as the user initially intended at the workstation. The loudness scaling may allow for dynamic changes to the loudness of the sound source while remaining true to the intended relationship between position of the user relative to the sound source. Additionally, or alternatively, a method may include obtaining a desired loudness or desired scaling factor of a sound source (e.g., a ratio such as X loudness at Y distance) of an audio work. The method may estimate how loud that sound is to be played at the authoring station (e.g., during an auditioning of the sound) so that the author hears it to match the desired loudness or scaling factor of the sound source in the audio work. The method may include outputting the sound source with the authoring loudness at the authoring station. The authoring loudness may be determined by measuring the loudness of the output sound at the listener (e.g., with one or more microphones), and adjusting the authoring loudness if needed, to match the desired loudness or scaling factor based on the measured loudness. Additionally, or alternatively, the method may determine the loudness by applying a distance-based loudness model to a sensed distance between the author and the authoring station (e.g., speakers of the authoring station) to match the authoring loudness to the desired scaling factor or desired loudness. The output sound would then dissipate over the distance between the author and the speakers such that they are heard by the author at the desired loudness or scaling factor.

In some aspects, a method includes presenting a sound source having a virtual position to a display, determining a position of a user relative to the display based on one or more sensors of a headworn device worn by the user, spatially rendering the sound source with a loudness that is based on the position of the user relative to the display and the virtual position of the sound source, and driving a left speaker and a right speaker of headworn device with a left audio channel and a right audio channel of the spatially rendered sound source. By accounting for the user's position at the workstation, and accounting for the virtual position of the sound source as seen by the user during the authoring of the content, the playback of the work may more accurately reflect the intention of the creator.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
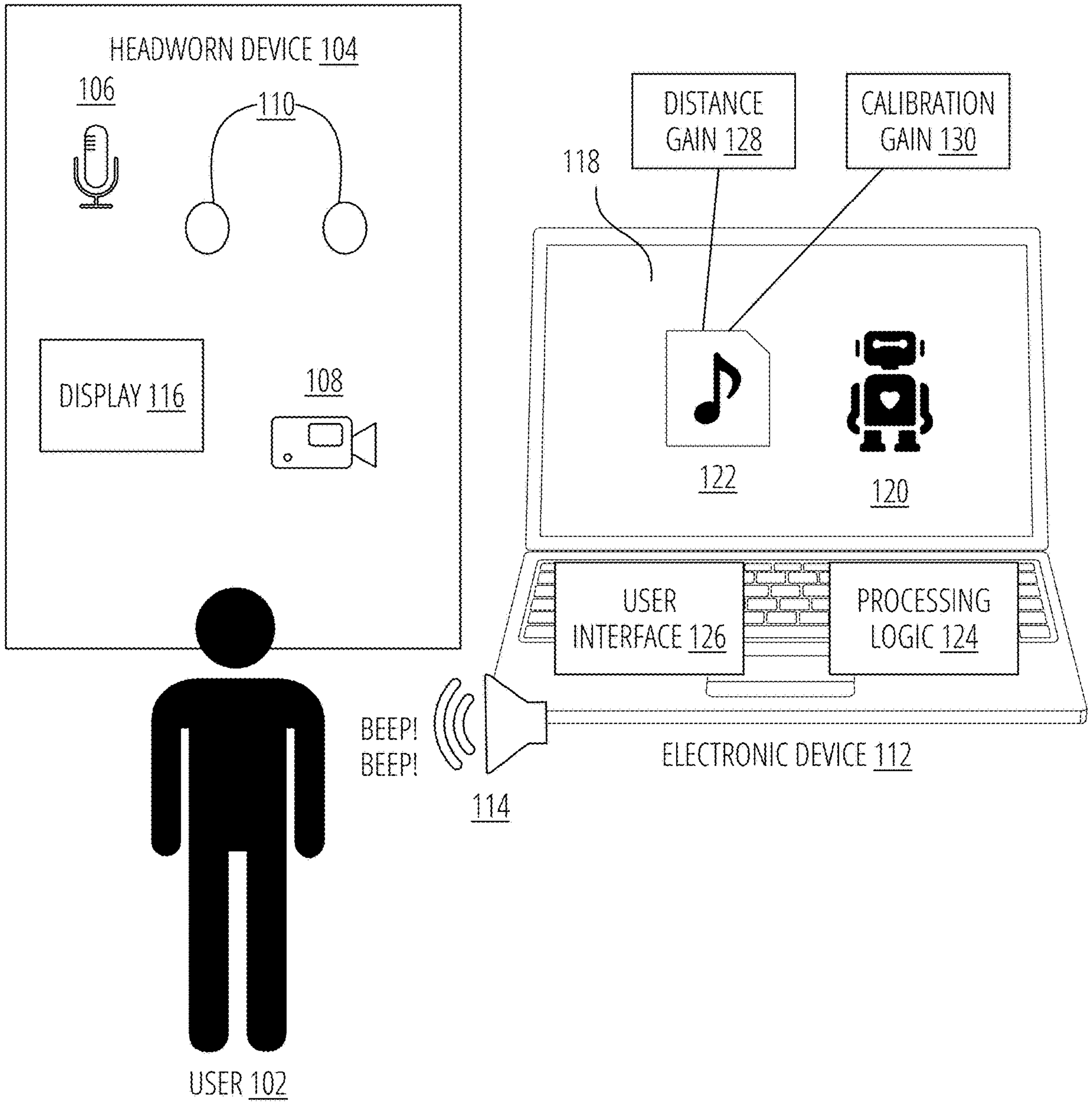
FIG. 1 shows an example electronic device for generating an audio work with a congruent experience, in accordance with some aspects.

When a user creates an audio work in an authoring environment, which may include one or more electronic devices, the user may wish to audition and select sounds for one or more sound sources. The user may attach a selected sound to a sound source in the audio work. The user may give the sound source a virtual location in the audio work. The selected sound may be spatially rendered so that it appears to emanate from that virtual location. The authoring environment may allow the user to select different sounds and configure how loud the sound should be. When the work is played back to the listener in the playback environment, the audio experience may differ from that of the authoring environment, due to differences between the playback environment and the authoring environment. As such, some of the author's intent for the sound source (e.g., how loud the sound source should sound to the listener) may be lost. To preserve the author's intent and provide a consistent content creation experience, the volume of the workstation's speakers may be set so that when the sound is previewed with the sound source shown on the workstation (in the authoring environment), the sound is heard at the same level at the author's cars as when the sound is to be played later in the playback environment.

Differences between the authoring environment and the playback environment may vary. For example, in some cases, the authoring environment may include a laptop computer, a desktop computer, a headworn device, or a mobile device such as a tablet computer or a mobile phone. The playback environment may be the same or like the authoring environment, having a similar display and speaker location relative to the listener as that of the author and the authoring environment. In other cases, however, the authoring environment may have a vastly different display or speaker arrangement than the playback environment. For example, in the playback environment, the listener may experience the work through speakers on a headworn device (e.g., a headphone set) whereas the author auditioned the work through speakers. Additionally, or alternatively, the listener may experience visual components of the work through a head mounted display (HMD) rather than a stationary display that is viewed from a distance (e.g., an arm's length or greater). Conventional authoring environments may not account for such differences in environments and, as a result, the sound source may be played back to the user in a manner that is contrary to the author's intent.

Aspects of the present disclosure may automatically present the loudness of the sound sources at the workstation such that content heard from the workstation more closely matches the loudness of the sound sources when the audio work is played to a listener at the playback environment. An audio work may include a traditional form of media such as a song, a movie, a video clip, or other passive content. The audio work may also include more interactive media content such as a game, an application, or an experience. In some aspects, the audio work may include an immersive environment such as an extended reality environment.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user like how such views and sounds would change in a physical environment. In another example, the XR system can detect movement of an electronic device that presents the XR environment (e.g., a mobile phone, tablet, laptop, or the like) and adjust graphical content and auditory content presented to the user like how such views and sounds would change in a physical environment. In some situations, the XR system can adjust characteristic(s) of graphical content in response to other inputs, such as a representation of a physical motion (e.g., a vocal command).

Many distinct types of electronic systems can enable a user to interact with and/or sense an XR environment. A non-exclusive list of examples includes heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Immersive experiences such as an XR environment, or other audio works, may include spatial audio. Humans can estimate the location of a sound by analyzing the sounds at the ir two cars. This is known as binaural hearing and the human auditory system can estimate directions of sound using the way sound diffracts around and reflects off our bodies and interacts with our pinna. These spatial cues can be artificially generated by applying head related impulse responses (HRIR) (e.g., spatial filters) to audio signals. These HRIRs imitate the effect of a user's body and ear geometry on sound by artificially imparting spatial cues into the audio, such as gains and/or delays for each of a plurality of frequency bands. The spatial cues imitate the diffractions, delays, and reflections that are naturally caused by our body geometry and pinna. The spatially filtered audio can be produced by a spatial audio reproduction system (a spatial audio engine) and output through headphones. Such audio may be perceived by a listener as originating from given direction, such as at a location above, below, in front, behind, or to the side of a listener.

In some instances, the user may develop an audio work that includes visual components. Such a work may also be referred to as an audiovisual work. In such a case, during playback of the work, sound may be spatialized to give a sense of direction to a sound, where the spatial rendering of the sound corresponds to a visually rendered location of the sound source.

FIG. 1 shows an example electronic device 112 for generating an audio work 122 with a congruent experience, in accordance with some aspects. The electronic device 112 may have one or more speakers 114 and a display 118. In some aspects, the electronic device 112 may include a laptop (as shown), a desktop, a monitor, a mobile device, a head-worn device, or other electronic devices or combinations thereof. In some aspects, the electronic device 112 may include a combination of electronic devices. Speaker 114 may be integral to or separate from display 118. A user 102 may use the electronic device to author an audio work 122. As discussed, audio work 122 may include an audiovisual work that includes one or more sound sources 120 that may be represented visually, but not necessarily, by a model. The one or more sound sources 120 may be presented on the display 118 when auditioning a corresponding sound (e.g., an audio signal) for the sound source 120.

The electronic device 112 may include processing logic 124 that is configured to perform operations and methods described in the present disclosure, such as method 300, 400, 500, and aspects thereof. Processing logic 124 may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Processing logic 124 may include hardware and software that a user 102 may use to create or edit an audio work 122.

In some examples, the user 102, which may be understood as an author, may create a project in a scene composition tool such as, for example, Reality Composer, which may be used to build audio work 122. The user 102 may import a sound source to the project and add the sound source to a scene of the audio work. The sound source 120 may include a three-dimensional or two-dimensional model that defines the sound source's geometry and/or size in 3-dimensional or two-dimensional space. In some cases, a sound source 120 may not have a visual representation, although it may still have a virtual location in the audio work 122. A sound source 120 may also be understood as an object (e.g., in an object-based audio format).

The user may create or source a sound (e.g., from a library of digital audio assets) for a sound source 120 and import that sound into a scene of the audio work 122. When authoring, each audio work 122 may have a project that organizes assets (e.g., audio, and visual components) for the creating of the audio work. The project may include user configurable settings which may be exposed to a user to adjust settings to the user's liking. The user 102 may audition a variety of sounds at the electronic device 112 to select an appropriate sound for sound source 120. The user 102 may use a digital audio workstation (DAW) application running on the same electronic device 112 to edit or mix the sound for sound source 120. The user 102 may associate a selected sound (e.g., a 'beep') to the sound source 120. In some examples, the user 102 may configure spatial audio characteristics of how those sounds will be played. This could include positioning sound source 120 in a virtual environment of the audio work 122, and previewing the sound source as it is shown visually (e.g., represented by a model) on the display 118 of the electronic device 112. This preview could include a spatial rendering of the sound source based on the sound source's position in the virtual environment of the audio work 122.

A spatial audio preview may be provided by the electronic device 112 by using a viewpoint position (which serves to represent a user's head position) and virtual position of the sound source relative to the viewpoint, to spatialize the sound source. This alone, however, does not account for the position of the user 102 or the user's position relative to the electronic device 112. Although the user 102 may have complete control of the volume control of the electronic device 112, the user would still be in the dark as to how the sound source will be experienced in a playback environment.

As such, when the user 102 tests the audio work 122 in the playback environment, which may include a headworn device 104, the loudness of the sound source 120 may be heard by the user 102 to be different from the loudness of the sound source when heard through the speakers 114 of the electronic device 112.

Without a protocol to match the acoustic experience at the electronic device 112 to that at the headworn device 104, the user may hear the sound source at a different loudness than when the user previewed the sound source on the electronic device 112. This difference in experience may be caused by differences between the authoring environment and playback environment, such as the distance between the cars of the user 102 and speakers 114, and/or the distance between the user 102 and the display 118 (and, how far the sound source 120 is perceived to be in the display. Volume settings of the electronic device 112 and the playback device (e.g., headworn device 104) may also cause a disparity between the two environments.

For the user 102 to have a congruent audio experience from their workstation, the audio from speakers 114 of the workstation should arrive at the user's cars at a known level. In some aspects, a user may wear a headworn device 104 while authoring an audio work 122 on electronic device 112. The headworn device 104 may include one or more microphones 106 that capture the sound being played from speakers 114 of the electronic device 112. The microphone signals or a loudness of the sound may be obtained by processing logic 124 of the electronic device 112. Processing logic 124 may adjust the software volume control of the speakers 114 up or down until a desired sound pressure level (SPL) is set by the user. Further, processing logic 124 may process microphone signals (e.g., beamforming or other spatial filtering) to focus the audio pickup on a forward direction (based on an assumption that the user is facing their workstation), thereby reducing background noise in the microphone signals. The one or more microphones 106 may include at least one microphone located at, above, over, or near each of the user's ear to accurately capture the loudness of the sound from the speakers 114 at the cars of user 102.

Additionally, or alternatively, headworn device 104 may include one or more cameras 108. Images generated by the cameras may be obtained by process logic 124 to determine the user 102's position (e.g., a location and/or head position) with respect to the electronic device 112. This may include the user's position relative to the speakers 114, and/or display 118. Processing logic 124 may adjust the sound from speakers 114 based on a known SPL and the distance the user is located from the user. The known SPL may be measured by the electronic device 112 at the speaker 114. Further, other sensors such as an accelerometer, a gyroscope, an inertial measurement unit (IMU) may be used to determine the user's position.

Headworn device 104 may be worn by the user 102 during authoring of the audio work 122. Sensors such as one or more microphones 106, camera 108, and/or other sensors, may be used to determine the loudness of sound source 120 as heard by user 102 during authoring. In some aspects, the headworn device 104 may also be worn by user 102 or another user during playback of the audio work 122. Thus, the headworn device 104 may represent part of the authoring environment, as well as the playback environment. Headworn device may include a display 116 that may present sound source 120 (or a visual representation thereof) to the user during playback. In some examples, the display may be a head-mounted display (HMD).

In some cases, while authoring the audio work 122, processing logic 124 may output the sound of a sound source through speakers 110 of headworn device 104. In such a case, if the playback environment will also include ear-worn speakers, the difference in loudness of the sound source as heard at the authoring environment and playback environment is little to none. The distance between the user and display, however, may still be different between the two environments. For example, if the electronic device 112 has a stationary display and the playback environment includes an HMD, the sound source may appear much farther to the user in the authoring environment than in the playback environment. To address such a discrepancy, processing logic 124 may play the sound on the HMD from the workstation based on a virtual sound source position that may be determined as a combination of the user's real world location (e.g., relative to the display 118), and the distance of the sound source 120 from the viewpoint from which the sound source is shown on the display 118. Display 118 may be treated like a window into a virtual world where the visual content is shown, and playing the sound associated with the sound source 120 on the electronic device relative to the user's physical location.

Processing logic 124 may be configured to play a sound source 120 through speakers 114 of an electronic device 112 (e.g., "Beep! Beep!"). This may be done in response to a user input to audition or test the sound source. Speakers 114 may be loudspeakers that are integral to the electronic device 112 or they may be standalone loudspeakers (e.g., housed in loudspeaker cabinets).

Processing logic 124 may determine a loudness of the sound source as heard by a user 102 of the electronic device. As discussed, the loudness may be determined by measuring the sound source at the user's cars with one or more microphones 106, or using visual data from one or more cameras 108, or a combination thereof.

Processing logic may determine a playback loudness for the sound source that matches the loudness of the sound source as heard by the user. For example, processing logic 124 may set a playback loudness of "Beep! Beep!" to be 60 dB SPL which matches the "Beep! Beep!" as sensed by microphone 106 when the user 102 auditioned and set the level of sound source 120 (e.g., at level 5). Without determining the loudness of the sound source as heard by user 102, the remaining loudness information for sound source 120 is 'level 5' which does not indicate how loud the user 102 experienced sound source 120. Processing logic takes the loudness heard at the user's cars (either measured or estimated) to be the desired loudness of the user 102. Processing logic 124 may author an audio work 122 which includes the sound source 120 and the desired playback loudness. Upon playback of the audio work 122, the sound source 120 may be output by speakers 110 of a headworn device 104 at the playback loudness (e.g., 60 dB SPL). The playback environment may include the same headworn device 104 or a different headworn device that was used during authoring, if any. The playback environment may include a left speaker and a right speaker that is worn in-ear, on-ear, over the cars, or near the cars (e.g., off the cars).

In some aspects, processing logic 124 may analyze a plurality of microphone signals of microphones 106 (e.g., in a forward direction relative to the user) to emphasize sensing of the sound source through the speakers of the electronic device. This can reduce pickup of background noises in the user's environment. Processing logic 124 may spatially filter (e.g., beamforming) the microphone signals to create a pick-up beam in a forward direction relative to the user, assuming that the user is looking in the direction of the electronic device 112 and its speakers 114. Beamforming may include applying various gains or delays to frequency bands of the microphone signals to create constructive or destructive interference in the captured acoustic space, thereby emphasizing sound in one or more directions and de-emphasizing sounds in one or more other directions.

Additionally, or alternatively, processing logic may determine a position of the user relative to the speakers of the electronic device based on one or more camera images (obtained from camera 108) to determine the loudness of the sound source as heard by the user. Processing logic may attenuate the loudness that is output by the speakers based on the position of the user relative to the speakers. For example, if the user is determined to be 'y' feet away from the speakers (based on the camera images), and the loudness of the sound source is measured at 'x' decibels at speaker 114, processing logic may determine the loudness by reducing the loudness of 'x' decibels using the distance 'y' and known relationships between distance and sound attenuation (e.g., the inverse square law). In some aspects, the camera 108 may be integral to the electronic device 112. The electronic device 112 may estimate the distance between the user 102 and the electronic device 112 (and/or speakers 114) without other devices (e.g., without headworn device 104). Camera 108 may include one or more sensors such as, for example, an RGB camera, a depth camera, or other image sensor.

The loudness of the sound source 120 when heard in the playback environment may be determined according to several factors, some of which may be defined in the audio work (e.g., metadata), and some by the runtime context of the playback environment. Runtime context may include tracking of the user. For example, with a headworn device 104, a position of the user may be tracked and this position may be used to render the sound source relative to the position of the user during playback in a dynamic manner. Metadata may memorialize the author's intent in the authoring environment. For example, processing logic 124 may take user input that specifies how loud the sound source 120 should be at a given distance from a listener, e.g., 'n' SPL at 'y' meters. This loudness ratio may be used to dynamically scale the loudness of that sound if the distance between listener and sound source changes during playback. For example, during playback, a user 102 wearing the headworn device 104 may move closer to or farther away from the sound source 120 in an extended reality environment. The loudness of the sound source may be heard to be coming from the sound source 120. The sound source may grow louder as the user moves closer to the sound source, and quieter as the user moves away from the sound source. The scaling of the sound may be based on the relationship of 'n' SPL at 'y' meters. Although the relationship may remain unchanged, the loudness as heard by the user may be dynamically adjusted based on the current distance between the user and the sound source.

In some aspects, processing logic 124 may present the sound source 120 on a display of the electronic device 112 during authoring. The sound source 120 may be represented as a graphical model, which may include a three-dimensional model, an image, a two-dimensional model, or other graphical representation of a sound source. Processing logic 124 may determine a relationship based on a) a combined distance between the user and the display and between the sound source 120 and a viewpoint from which the sound source 120 is shown from; and b) the playback loudness for the sound source. The playback loudness for the sound source may be the playback loudness as heard by the user.

For example, if the user is positioned 'B' distance away from the display, and the sound source 120 is shown in the display to be another 'A' distance away from the viewpoint (e.g., a camera), then the sound source 120 may be seen as 'A+B' distance away from the user at the time of authoring. The sound source through speakers 114 may be heard at the user's ears at 'm' dB. As such, at the time of authoring, processing logic may assume that the user intends for the loudness of sound source 120 to be heard at 'm' dB when the sound source appears to be 'A+B' distance away from the user. Processing logic 124 may associate the relationship (e.g., a ratio such as 'm' decibels at 'A+B' distance) with the sound source 120 in the audio work 122 for playback of the audio work 122.

When the audio work 122 is experienced later during playback, this relationship between loudness and distance may be maintained in a dynamic manner. For example, processing logic may dynamically change the playback loudness during the playback of the audio work 122 based on the relationship, in response to a change to a listener position relative to a virtual position of the sound source. As discussed, the user 102 may wear a headworn device 104 in the playback environment, that may include head tracking sensors (e.g., a camera, accelerometer, gyroscope, inertial measurement unit, or a combination thereof) to track the user's position. Head tracking may be performed inside-out or outside-in, using one or more head tracking algorithms.

In some aspects, processing logic 124 may store, in the audio or audiovisual work, one or more parameters that memorialize the desired loudness of each sound source as it will be played back to the user. For example, a total calibration gain 130 may be applied to an audio signal of sound source 120 during run time of the audio work 122. The total calibration gain 130 may include at least a gain value that is configured in view of (or to match) the desired sound level that is indicated by a user (the author), which may be through an input parameter of an application programming interface (API) or user interface. The desired sound level may be the level at which the author desires an end user (e.g., a listener) of the work to hear during run time of the work, at some reference virtual distance from a virtual object (which represents the sound source 120). In some aspects, processing logic 124 automatically determines the total calibration gain 130 for a sound source 120 to match the measured or estimated loudness of the sound source heard by the user 102 at time of authoring. In this manner, the playback of the audio asset is gain-corrected to reflect the expected real world sound level desired by the author. Additionally, or alternatively, recognizing that the virtual distance between a listener and a sound source can change over time, the audio work 122 may include a relative distance gain 128. The relative distance gain 128 may include a gain value which is a function of the virtual distance between the virtual object and the virtual position of the listener during run time of the work. The relative distance gain 128 may be automatically applied to an audio signal of the sound source 120, during run time. Processing logic may determine the relative distance gain 128 based on configurable parameters which may be set through an API or user interface 126.

In some aspects, processing logic 124 may further adjust the loudness of the sound source 120 as heard by the user or change a content of the sound source in response to input from user 102. For example, electronic device 112 may include a user interface 126 that includes controls for the user to increase or decrease the loudness of sound source 120, until it is set at the desired loudness. User interface 126 may include a keyboard, a mouse, a touchscreen display, graphical user interface elements, and/or other user interface components. Processing logic may also place the sound source in a virtual location based on user input obtained through user interface 126.

In some aspects, determining the playback loudness for the sound source includes compensating for a loss or gain of the playback loudness for the playback device, which may be a headworn device. For example, processing logic 124 may obtain audio characteristics of speakers 110 of the headworn device. Based on these audio characteristics, processing logic 124 may increase the playback loudness to accommodate for weak speakers at the playback device or decrease the playback loudness to accommodate for strong speakers at the playback device, to better match the authoring loudness as heard by the user to the playback loudness of the sound source.

In some aspects, processing logic 124 may spatialize sound source 120 in the audio work 122. For example, processing logic 124 may spatially filter sound source 120 in response to a virtual position of sound source 120 relative to a viewpoint from which the sound source is shown (e.g., a camera or virtual camera). In some aspects, spatially filtering the sound source 120 may include applying a head related transfer function (HRTF) or head related impulse response (HRIR) to the sound source 120. Further, during playback, additional spatial filtering may be applied to the sound source 120 by the playback device to dynamically change the perceived direction of sound from the sound source 120 to correspond with changes in the virtual position between the user and the virtual representation of the sound source. In some aspects, spatialization is performed at the playback device rather than in the authoring environment, using positional information of the sound source which may be stored in metadata of the audio work 122.

Processing logic 124 may obtain a desired loudness or scaling factor of a sound source (e.g., a ratio such as X loudness at Y distance) in an audio work. Processing logic 124 may estimate how the sound how loud that sound is to be played at the authoring station (e.g., during an auditioning of the sound) so that the author hears it to match the desired loudness or desired scaling factor 236 of the audio work. Processing logic 124 may output the sound with the authoring loudness 234 at the authoring station. The authoring loudness 234 may be determined by measuring the loudness of the output sound at the listener (e.g., with one or more sensors 216 such as microphones), and adjusting the authoring loudness 234 if needed, to match the desired loudness or scaling factor. For example, processing logic 124 may increase the authoring loudness 234 if the measured loudness is sensed to be below the desired loudness or desired scaling factor. Similarly, processing logic 124 may decrease the authoring loudness 234 if the measured loudness is sense to be above the desired loudness or desired scaling factor. Additionally, or alternatively, the method may determine the loudness by applying a distance-based loudness model (e.g., the inverse square law or other distance-based loudness model) to a sensed distance between the author and speakers of the authoring station and the desired scaling factor to obtain the authoring loudness. The distance may be sensed, for example, based on one or more cameras, by processing audio signals using a time of arrival (TOA) algorithm, or other sensing technique. Processing logic 124 may drive speakers 202, 204 of the authoring station with an audio signal of the sound source. The speakers may be driven at the authoring loudness 234. The output sound will dissipate over the distance between the author and the speakers such that the author hears them to match or approximate the desired loudness or the desired scaling factor 236.

As such, processing logic may output the auditioned sound in the authoring environment to resemble the desired loudness of the audio work or memorialize a ratio in the audio work that matches the loudness as heard in the authoring environment, or both. By doing so, processing logic may loudness match the authoring experience to the authored work in either direction.

Figure 2:
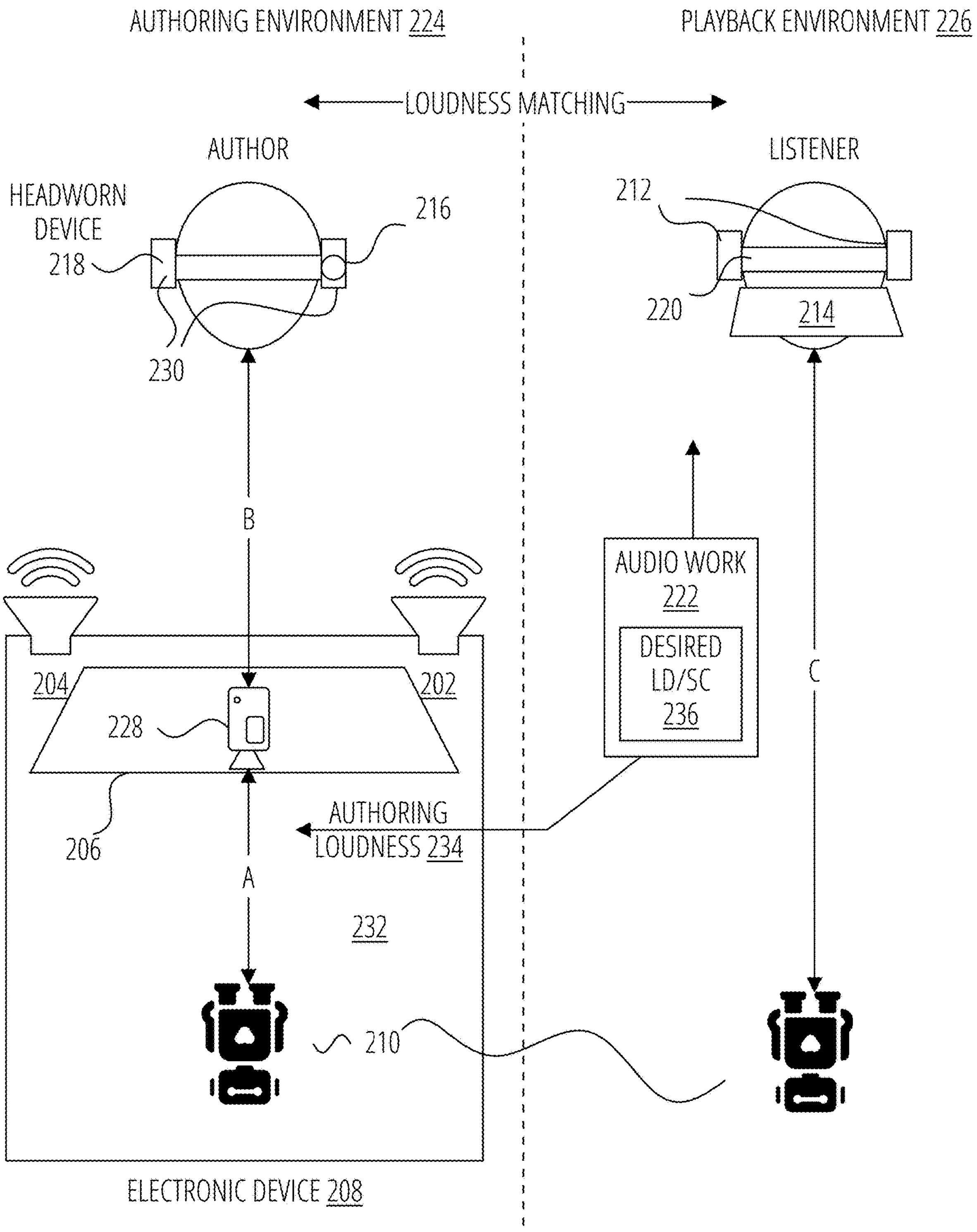
FIG. 2 shows an example of an authoring environment and a playback environment, in accordance with some aspects.

FIG. 2 shows an example of an authoring environment 224 and a playback environment 226 in accordance with some aspects. An author of an audio work 222 may place a sound source 210 in a scene of the work and assign this sound source a virtual location in the work. The sound source may be virtually located relative to a viewpoint 228 that the sound source is shown from. The viewpoint may be a virtual camera or a physical camera that may move around in the virtual space 232 of audio work 222. This viewpoint may represent the listener's gaze or point of view in the playback environment 226. The author may place the sound source 210 in the space 232 at various positions which may be far or close to the viewpoint 228. A spatial rendering engine may spatially render a sound that is associated with the sound source based on the position of the sound source relative to the viewpoint, e.g., with distance 'A.' In the authoring environment 224, however, a distance 'B' may be present between the author and the display 206. Thus, the author may hear the loudness from speakers 202, 204 at a loudness 'm' and intend for the sound source to be this loud at distance 'A+B'. As discussed with respect to FIG. 1, the electronic device 208 may account for losses in the acoustic energy from the speakers 202, 204 to the listener's cars, but without knowledge of the author's position, the electronic device may associate this loudness 'm' with distance 'A' without accounting for distance 'B'.

In some aspects, an authoring environment 224 may include an electronic device 208 that is configured to play a sound source (e.g., 210) through speakers 202, 204 of the electronic device. The author may adjust levels of that sound source until the author is satisfied with the loudness of the sound source, while previewing a visual representation of the sound source 210 through display 206.

The electronic device 208 may determine a loudness of the sound source as heard by a user of the electronic device. As discussed, this may be determined through one or more sensors 216 which may be integral to a headworn device 218 worn by the author. In some aspects, the one or more sensors 216 may be integral to electronic device 208. The one or more sensors may include a microphone, a camera, and/or other sensors. The loudness of the sound source 210 which is output from speakers 202, 204 and heard by the author may be determined based on the sensed loudness at or near the author's cars. Additionally, or alternatively, the loudness of sound source 210 may be estimated based on distance of the author from the speakers 202, 204, where that distance may be determined from the one or more sensors 216.

The electronic device 208 may determine a playback loudness for the sound source that matches the loudness of the sound source as heard by the user and associate the playback loudness for the sound source with a position of the user relative to the electronic device. For example, if the playback loudness is 'm' and the position of the author relative to the display 206 of the electronic device includes a distance 'B' from display 206, then the electronic device may store this relationship in audio work 222. This distance 'B' may be accounted for in the playback environment (e.g., in a spatial rendering process).

Electronic device 208 may author the audio work 222 which includes the sound source 210. Upon playback of the audio work (in playback environment 226), the sound source 210 is output by speakers 212 of a headworn device 220 at the playback loudness. This playback loudness may be scaled based on the position of the author relative to the electronic device as memorialized in audio work 222. In some aspects, audio work 222 may include the position of the author relative to the display (e.g., a distance B), and the position of the sound source 210 relative to viewpoint 228 (e.g., a distance A). During playback, the sound source may be shown on an HMD 214. Assuming that distance A+distance B in the authoring environment is equal to distance C in the playback environment 226, the headworn device 220 will output the sound source 210 in the playback environment 226 with a loudness that matches that which the author heard in the authoring environment 224, when the sound source 210 is a virtual distance C away from the listener in the playback environment 226.

Further, this sound source 210 may be rendered in the playback environment 226 to be louder or quieter, in response to changes in the virtual distance between the listener and the sound source 210. These changes may result from the listener moving 'towards' or 'away' from the sound source in an extended reality environment where the user's position is tracked. Alternatively, even if the user's position is static, the sound source 210 may move (e.g., closer, or farther) relative to viewpoint and the listener. The loudness of the sound source, however, may still be rendered based on the initially stored relationship between loudness and relative position of the sound source to the user, although the loudness may be adjusted to reflect the updated relative position of the sound source to the user.

In some aspects, the authoring environment 224 may include headworn speakers 230 on headworn device 218. These speakers may be work on-ear, in-ear, off-ear, or over the ear speakers. The speaker arrangement in such an authoring environment 224 may be the same as or approximate that of playback environment 226. Electronic device 208 may be configured to present to a display, a sound source 210 having a virtual position a virtual space 232. For example, the sound source 210 may be visually represented by a two-dimensional model or three-dimensional model, which is shown to be a distance 'A' away from viewpoint 228. Electronic device 208 may determine a position of an author relative to the display 206 based on one or more sensors of a headworn device worn by the user. For example, electronic device 208 may obtain information from sensors 216 (e.g., microphone signals, camera images, head position information, etc.) and determine a distance 'B' between the author's head and the display 206.

In such a case, where the authoring environment includes headworn speakers 230, the electronic device 208 may spatially render the sound source 210 with a loudness that is based on the position of the user relative to the display and the virtual position of the sound source 210. The virtual position of the sound source 210 may be understood as the position of the sound source 210 relative to viewpoint 228.

For example, the electronic device 208 may spatially render the sound with a distance of 'A+B' at a select level, resulting in binaural audio that includes a left audio channel and a right audio channel. The electronic device 208 may drive a left speaker and a right speaker (e.g., headworn speakers 230) of headworn device 218 with the left audio channel and the right audio channel of the spatially rendered sound source 210. With the headworn speakers in the authoring environment 224, the electronic device 208 may preserve the author's intent for the loudness of the sound source at a given perceived distance for the playback environment 226 by presenting the loudness in a manner that accounts for both the position of the author relative to the electronic device 208 and the position of the sound source 210 relative to the viewpoint 228. The author may select and author audio work 222 with a desired loudness that is experienced by the author at a perceived distance of 'A+B'. In the playback environment 226, the headworn device 220 may output sound source 210 with a loudness that matches the desired loudness of the author when the sound source 210 is a distance 'C' away from the listener that is equal to the combined distance 'A+B'.

In some examples, although not necessarily, the headworn device 218 and headworn device 220 may be the same device. In some examples, headworn device 218 may include an HMD. The HMD of headworn device 218 may operate in a first mode that provides visibility of the display 206 to the user. This mode may be understood as a 'transparent' mode. For example, the headworn device 218 may have a camera that displays the physical world to the user through the HMD such that the HMD serves as a 'window'. In other examples, the HMD may include a glass display that is transparent, but has images projected onto it. This mode allows the author to use the electronic device 208 for authoring an audio work 222 while using headworn speakers 230 and/or sensors 216 of the headworn device 218 to help determine the desired loudness of the sound source, as described.

The headworn device 218 may have a second mode where the sound source is presented visually to the user on the HMD which obstructs the display. This may be understood as an immersive or non-transparent mode in which the HMD visually blocks the environment of the author and fully immerses the author in a virtual environment. In the second mode, the headworn device 218 may render a playback loudness of the sound source based on a virtual distance in a virtual environment shown through the HMD of headworn device 218. The loudness of the sound source 210 in this mode may match the loudness that is determined based on a combined distance between the position of the user and the display and a distance between the sound source and the viewpoint (e.g., distance A+B). In such a manner, the user may toggle between the first mode and the second mode to test the audio work 222 under different conditions. In the first mode (e.g., the transparent mode), the user sees the sound source on display 206 and hears the sound source 210 as spatially rendered by electronic device 208 as distance A+B through headworn speakers 230. In the second mode (e.g., the fully immersive mode), the sound source is presented with a virtual distance of C is perceived by the author to be the same as A+B and played through headworn speakers 230. The loudness of the sound source 210 may be rendered with the same loudness to the user in both modes.

In some aspects, the audio work 222 or 122 may include an extended reality work. The audio work may include a plurality of sound sources (e.g., an object-based audio format), where each sound source (which may be referred to as an object) has a respective virtual location in the audio work. Each sound source may be spatially rendered based on its location relative to a viewpoint, which may eventually be the virtual location of the listener. The spatially rendered sound sources may be combined to form spatial binaural audio. In other aspects, the audio work may include one or more audio channels which may be associated with one or more speakers of a speaker-based audio format. Each speaker may represent a sound source and each speaker may have an intended location relative to a listener. These audio channels may also be spatially rendered and combined to form spatial binaural audio. In the authoring environment, the position of the author relative to the location of the sound source is preserved and used to render the sound source at playback, to preserve the desired loudness of the sound source at a given distance.

In some aspects, the audio work 222 or sound source 210 may represent a computer application, a song, or a movie. The audio work may be presented in a dedicated window, and that window may have a location on a display. In some aspects, the window may have a virtual location in XR environment and the sound source or audio work may be spatialized based on the virtual location in the XR environment.

Figure 3:
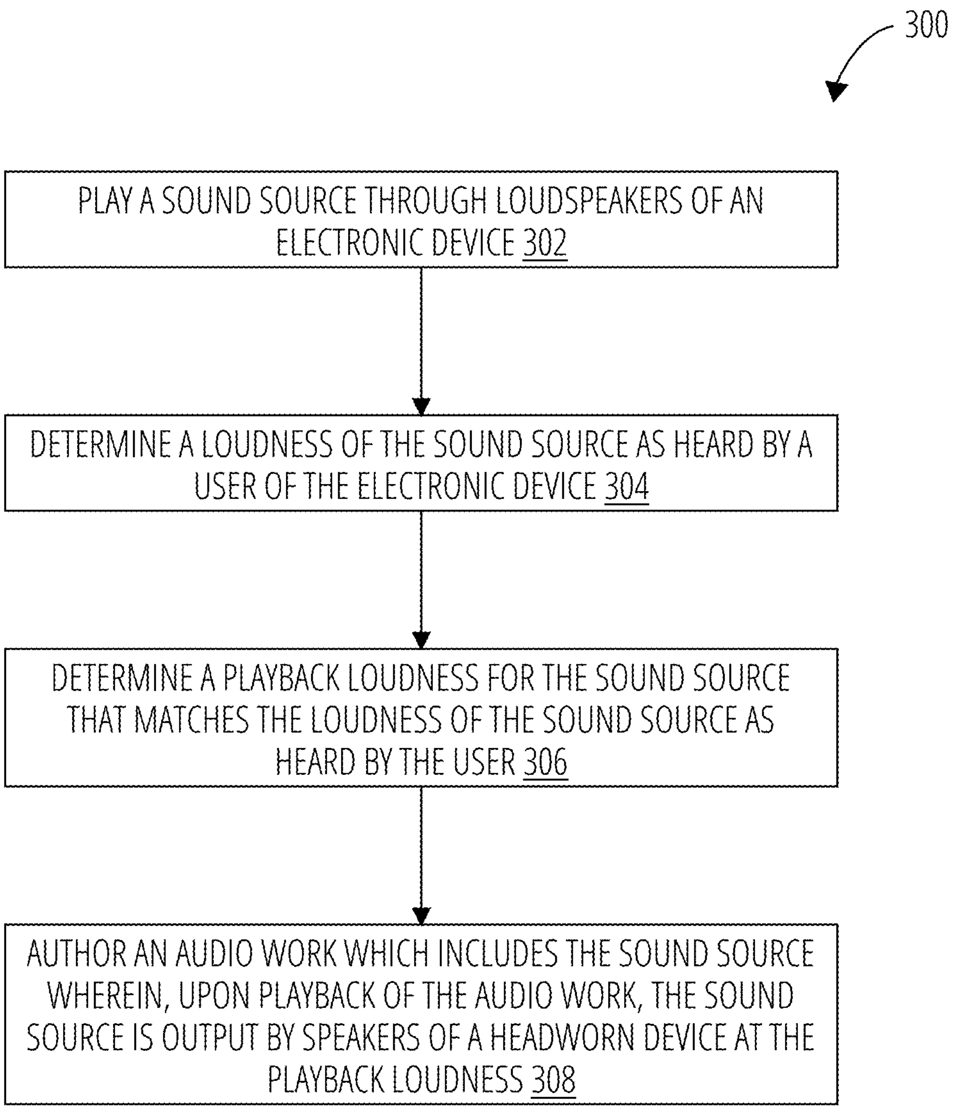
FIG. 3 illustrates a method for preserving audio information of an authoring environment of an audio work, in accordance with some aspects.

FIG. 3 illustrates a method 300 for preserving audio information from an authoring environment of an audio work, in accordance with some aspects. The method may be performed with various aspects described. The method 300 may be performed by an electronic device (e.g., 114, or 208) that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all the blocks in the method may be performed.

At block 302, the method plays a sound source through speakers of an electronic device. At block 304, the method determines a loudness of the sound source as heard by a user of the electronic device. At block 306, the method determines a playback loudness for the sound source that matches the loudness of the sound source as heard by the user. At block 308, the method authors an audio work which includes the sound source wherein, upon playback of the audio work, the sound source is output by speakers of a headworn device at the playback loudness. As discussed, this method may be implemented when the authoring environment includes speakers that are not worn by the user. The method accounts for losses that may occur to the sound as it travels from the speakers of the electronic device to the user, which may result in a disparity between the authoring environment and playback environment if not accounted for.

Figure 4:
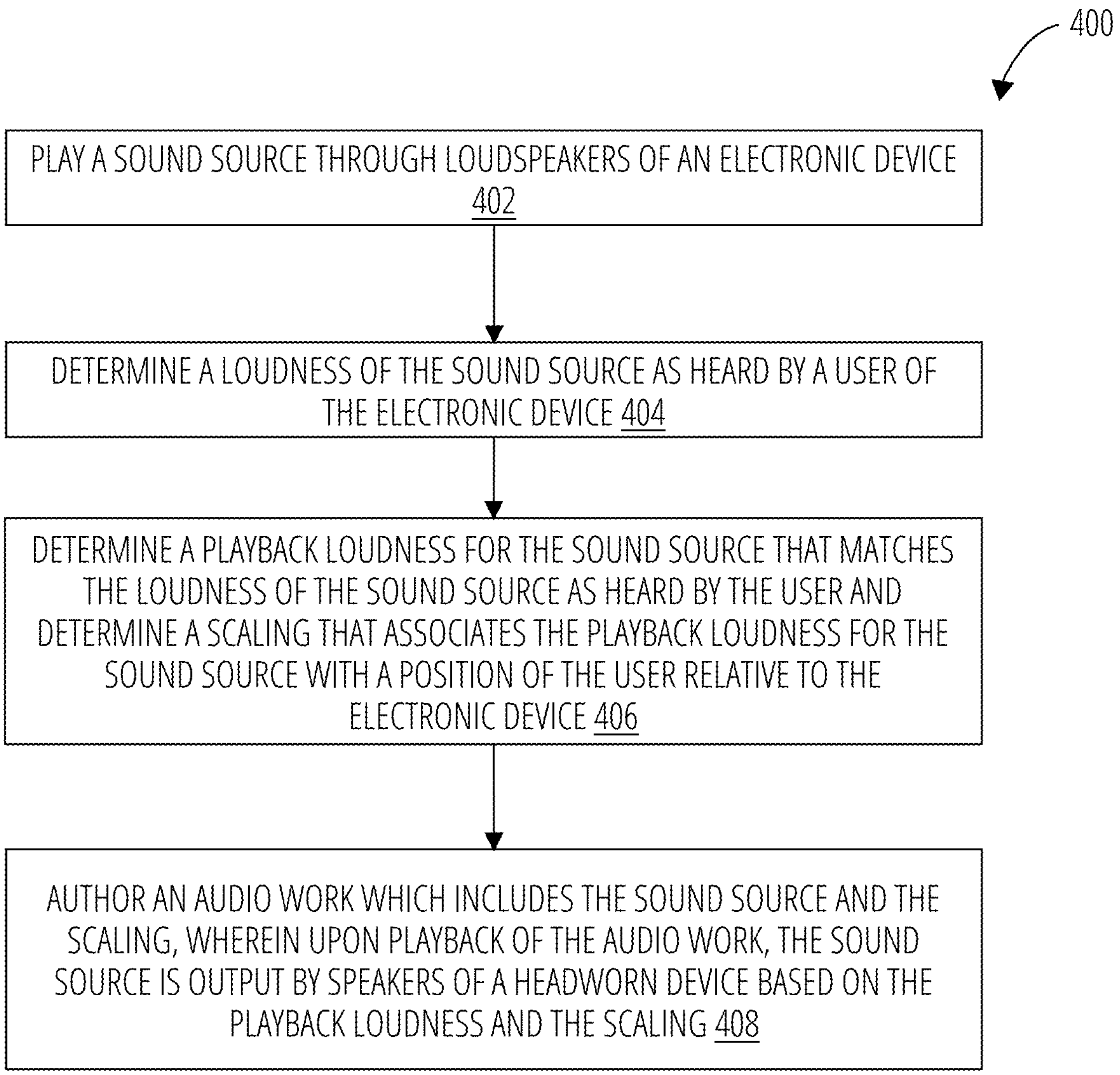
FIG. 4 illustrates a method for preserving audio information of an authoring environment of an audio work based on a position of the author, in accordance with some aspects.

FIG. 4 illustrates a method 400 for preserving audio information from an authoring environment of an audio work based on a position of the author, in accordance with some aspects. The method may be performed with various aspects described. The method may be performed by an electronic device (e.g., 114, or 208) that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all the blocks in the method may be performed.

At block 402, the method plays a sound source through speakers of an electronic device. At block 404, the method determines a loudness of the sound source as heard by a user of the electronic device. For example, the loudness of the sound source as heard by the user may be measured with microphones at the ears of the user, or estimated as described, to be 'X' dB.

At block 406, the method determines a playback loudness for the sound source that matches the loudness of the sound source as heard by the user and a scaling that associates the playback loudness for the sound source with a position of the user relative to the electronic device. For example, the playback loudness may be 'X' dB, and the position of the user relative to the electronic device may be a distance such as 'Y' meters.

At block 408, the method authors an audio work which includes the sound source and the scaling, wherein upon playback of the audio work, the sound source is output by speakers of a headworn device based on the playback loudness and the scaling. For example, during playback, the audio work may be decoded to play the sound source back at 'X' dB when the user is 'Y' virtual meters away from sound source. In some examples, as discussed, the position of the user relative to the electronic device may include a second virtual distance 'Z' that may include a distance between a virtual camera and a virtual representation of the sound source. As discussed, this method may be implemented when the authoring environment includes speakers and a display that are not worn by the user. The method accounts for the position of the user relative to the electronic device and for losses that may occur to the sound as it travels from the speakers of the electronic device to the user, both of which may create a disparity between the authoring environment and playback environment if not accounted for.

Figure 5:
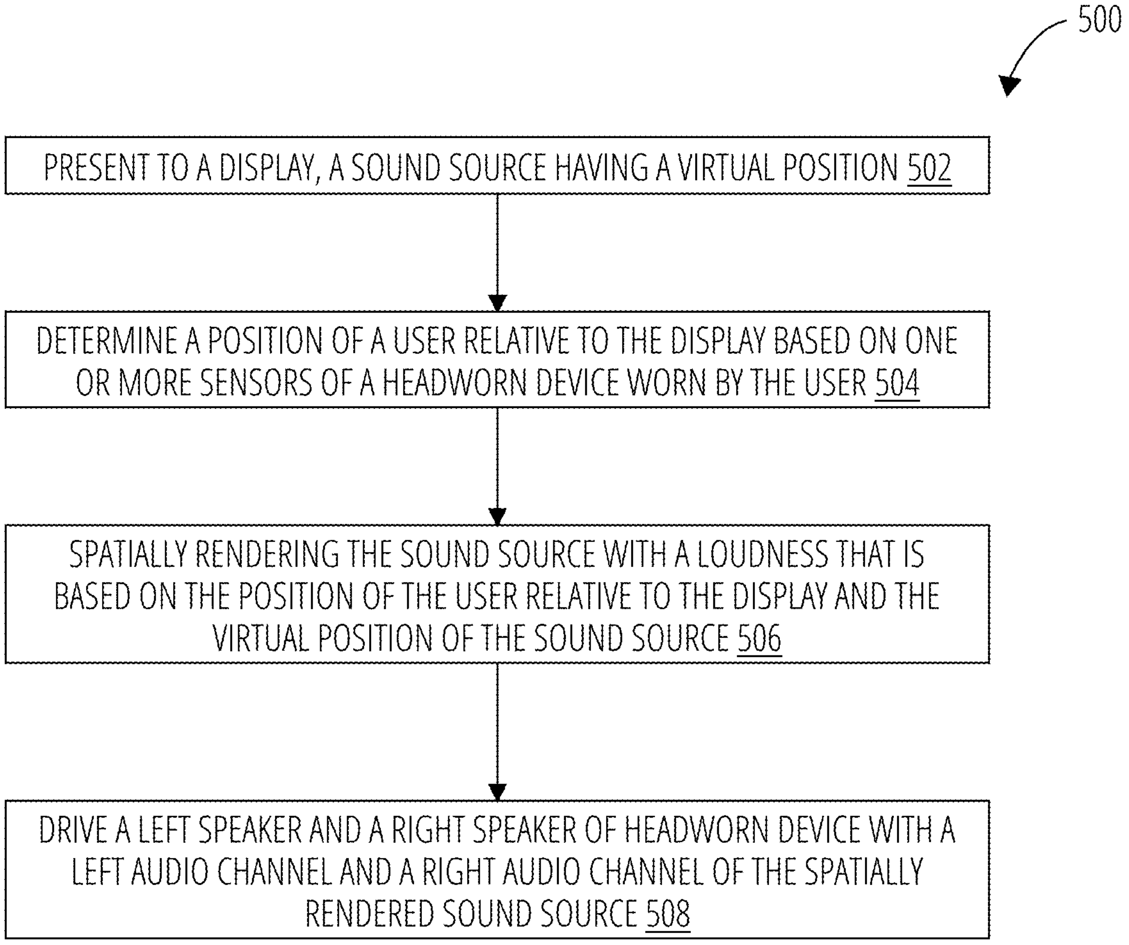
FIG. 5 illustrates a method for preserving audio information from an authoring environment of an audio work when the authoring environment includes headworn speakers, in accordance with some aspects.

FIG. 5 illustrates a method 500 for preserving audio information from an authoring environment of an audio work when the authoring environment includes headworn speakers, in accordance with some aspects. The method may be performed with various aspects described. The method may be performed by one or more electronic devices (e.g., 112, 104, 208, 218, or a combination thereof) that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all the blocks in the method may be performed.

At block 502, the method presents to a display a sound source having a virtual position. At block 504, the method determines a position of a user relative to the display based on one or more sensors of a headworn device worn by the user. At block 506, the method spatially renders the sound source with a loudness that is based on the position of the user relative to the display and the virtual position of the sound source. At block 508, the method drives a left speaker and a right speaker of headworn device with a left audio channel and a right audio channel of the spatially rendered sound source. As discussed, this method may be implemented when the authoring environment includes speakers of a headworn device and a display such as a standard stationary display that is not an HMD or an HMD with a transparency or pass-through feature where a camera may present the external environment of a user on the HMD.

Another aspect of the disclosure here is a method, comprising: obtaining a desired loudness or desired scaling factor of a sound source; determining an authoring loudness of the sound source that corresponds to the desired loudness or the desired scaling factor of the sound source; and outputting the sound source with the authoring loudness at an authoring station. In one aspect, determining the authoring loudness of the sound source includes measuring a loudness of the sound source at a user of the authoring station using one or more microphones, and setting the authoring loudness to match the desired loudness or the desired scaling factor based on the measured loudness. In another aspect, determining the authoring loudness of the sound source is determined based on a sensed position of a user of the authoring station, and may also include applying a distance-based loudness model to a sensed distance between the user and speakers of the authoring station to match the authoring loudness to the desired loudness or the desired scaling factor. In still another aspect, outputting the sound source with the authoring loudness at the authoring station includes driving one or more speakers of the authoring station with an audio signal of the sound source at the authoring loudness.

Figure 6:
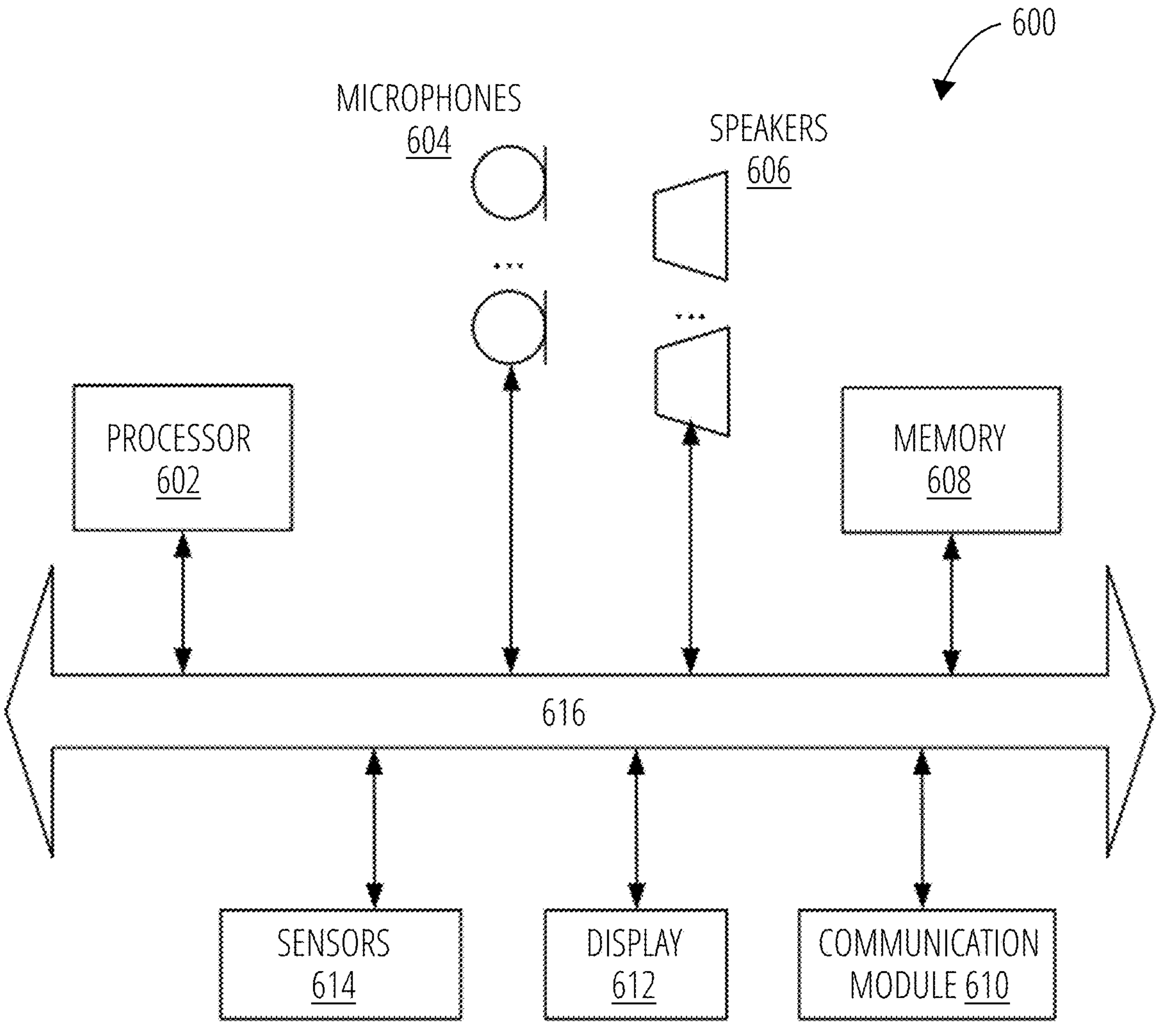
FIG. 6 illustrates an example of an audio processing system, in accordance with some aspects.

FIG. 6 illustrates an example of an audio processing system 600, in accordance with some aspects. The audio processing system can be an electronic device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any architecture or manner of interconnecting the components as such details are not germane to the aspects herein. It will also be appreciated if other types of audio processing systems that have fewer or more components than shown can also be used. Accordingly, the processes described herein are not limited to use with the hardware and software shown.

The audio processing system can include one or more buses 616 that serve to interconnect the various components of the system. One or more processors 602 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 608 can include Read Only Memory (ROM), volatile memory, and non-volatile memory, or combinations thereof, coupled to the bus using techniques known in the art. Sensors 614 can include an IMU and/or one or more cameras (e.g., RGB camera, RGBD camera, depth camera, etc.) or other sensors described herein. The audio processing system can further include a display 612 (e.g., an HMD, or touchscreen display).

Memory 608 can be connected to the bus and can include DRAM, a hard disk drive or a flash memory or a magnetic optical drive or magnetic memory or an optical drive or other types of memory systems that maintain data even after power is removed from the system. In one aspect, the processor 602 retrieves computer program instructions stored in a machine readable storage medium (memory) and executes those instructions to perform operations described herein.

Audio hardware, although not shown, can be coupled to the one or more buses in order to receive audio signals to be processed and output by speakers 606. Audio hardware can include digital to analog and/or analog to digital converters. Audio hardware can also include audio amplifiers and filters. The audio hardware can also interface with microphones 604 (e.g., microphone arrays) to receive audio signals (whether analog or digital), digitize them when appropriate, and communicate the signals to the bus.

Communication module 610 can communicate with remote devices and networks through a wired or wireless interface. For example, communication modules can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any source for the instructions executed by the audio processing system.

In the description, certain terminology is used to describe features of various aspects. For example, in certain situations, the terms "module", "processor", "unit", "renderer", "system", "device", "filter", "engine", "block," "detector," "simulation," "model," and "component", are representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are recognized as meeting or exceeding industry or governmental requirements for maintaining the privacy of users. Personally identifiable information data should be managed and handled to minimize risks of unintentional or unauthorized access or use, and the nature of authorized use should be clearly indicated to users.

What is claimed is:

1. A method, comprising:

playing a sound source through speakers of an electronic device;

determining a loudness of the sound source as heard by a user of the electronic device;

determining a playback loudness for the sound source that matches the loudness of the sound source as heard by the user; and authoring an audio work which includes the sound source, wherein upon playback of the audio work, the sound source is output by speakers of a headworn device at the playback loudness.

2. The method of claim 1, wherein determining the loudness of the sound source as heard by the user includes measuring the loudness of the sound source in microphone signals obtained from microphones of the headworn device or a second headworn device worn by the user.

3. The method of claim 2, further comprising analyzing the microphone signals in a forward direction relative to the user to emphasize sensing of the sound source through the speakers of the electronic device.

4. The method of claim 1, wherein determining the loudness of the sound source as heard by the user includes determining a position of the user relative to the speakers of the electronic device based on one or more camera images.

5. The method of claim 4, wherein determining the loudness of the sound source as heard by the user further includes applying an adjustment to the loudness of the sound source that is output by the speakers of the electronic device based on the position of the user relative to the speakers of the electronic device.

6. The method of claim 1, further comprising adjusting the loudness of the sound source as heard by the user or changing a content of the sound source in response to input.

7. The method of claim 1, wherein determining the playback loudness for the sound source includes compensating for a loss or gain of the playback loudness for the headworn device.

8. The method of claim 1, further comprising spatializing the sound source in the audio work.

9. The method of claim 1, wherein the headworn device includes a head mounted display (HMD) and the audio work includes a mixed reality, augmented reality, or virtual reality work.

10. An article of manufacture comprising a non-transitory machine-readable storage medium containing instructions that configure a processor to:

play a sound source through speakers of an electronic device;

determine a loudness of the sound source as heard by a user of the electronic device;

determine a playback loudness for the sound source that matches the loudness of the sound source as heard by the user; and author an audio work which includes the sound source, wherein upon playback of the audio work, the sound source is output by speakers of a headworn device at the playback loudness.

11. The article of manufacture of claim 10, wherein the processor is configured to determine the loudness of the sound source as heard by the user by measuring the loudness of the sound source in microphone signals obtained from microphones of the headworn device or a second headworn device worn by the user.

12. The article of manufacture of claim 10, wherein the processor is configured to determine the loudness of the sound source as heard by the user by determining a position of the user relative to the speakers of the electronic device based on one or more camera images.

13. The article of manufacture of claim 12, wherein the processor is configured to determine the loudness of the sound source as heard by the user by applying an adjustment to the loudness of the sound source that is output by the speakers of the electronic device based on the position of the user relative to the speakers of the electronic device.

14. The article of manufacture of claim 10, wherein the processor is further configured to adjust the loudness of the sound source as heard by the user or changing a content of the sound source in response to input.

15. The article of manufacture of claim 10, wherein the processor is configured to determine the playback loudness for the sound source by compensating for a loss or gain of the playback loudness for the headworn device.

16. The article of manufacture of claim 10, wherein the processor is further configured to spatialize the sound source in the audio work.

17. The article of manufacture of claim 10, wherein the headworn device includes a head mounted display (HMD) and the audio work includes a mixed reality, augmented reality, or virtual reality work.

18. A system comprising:

a plurality of loudspeakers;

a processor; and a non-transitory machine-readable storage medium containing instructions that configure the processor to determine a loudness of a sound source as heard by a user of the system listening through the plurality of loudspeakers;

determine a playback loudness for the sound source that matches the loudness of the sound source as heard by the user; and author an audio work which includes the sound source, wherein upon playback of the audio work, the sound source is output by a plurality of headworn device speakers at the playback loudness.

19. The system of claim 18, wherein the instructions configure the processor to determine the loudness of the sound source as heard by the user by i) measuring the loudness of the sound source in one or more microphone signals obtained from one or more microphones of a headworn device worn by the user, or ii) determining a position of the user relative to the plurality of loudspeakers based on one or more camera images.

20. The system of claim 18 wherein the instructions configure the processor to determine the loudness of the sound source as heard by the user by measuring the loudness of the sound source in one or more microphone signals obtained from one or more microphones of a headworn device worn by the user, wherein the headworn device includes a head mounted display (HMD) and the audio work includes a mixed reality, augmented reality, or virtual reality work.

* * * * *